3,090,117

METHOD OF BRAZING BERYLLIUM

Gale S. Hanks and Robert W. Keil, Los Alamos, N. Mex., assignors to the United States of America as represented by the United States Atomic Energy Commission
No Drawing. Filed Aug. 15, 1961, Ser. No. 131,686
2 Claims. (Cl. 29—494)

This invention relates to a method for joining articles of beryllium metal and more particularly the method by which beryllium parts to be joined together are coated with a silver-aluminum alloy using a lithium halide flux.

Before the nuclear, physical and mechanical properties of the metal of beryllium can be used to the best advantage it is necessary to develop a method of joining the metal to itself. Hitherto, the joining of beryllium parts by brazing was plagued with two major difficulties, i.e., oxidation of the beryllium metal, especially at elevated temperatures, and the lack of a brazing metal capable of metallically bonding with the beryllium. Applicants have overcome these obstacles by using a lithium halide flux to inhibit oxidation and by making a silver-aluminum alloy that bonds exceedingly well to the beryllium and to itself.

It is therefore an object of this invention to provide a process of brazing beryllium metal.

It is another object of this invention to provide a suitable brazing metal for the joining together of beryllium metal parts.

The brazing metal is a silver-aluminum alloy having a composition in the range of from about 65 to 75 percent silver and about 35 to 25 percent aluminum by weight. The brazing alloy preferably does not contain more than 75 percent silver because as the silver content of the alloy approaches 100 percent the brazing temperature approaches the melting point of silver, 960° C., and this high silver alloy possesses no apparent advantage in its brazing properties whereas the high temperatures are desirably avoided. A brazing alloy containing less than 65 percent silver would have the advantage of a lower brazing temperature would suffer from a serious defect in that the alloy in this composition range does not adhere well to the beryllium metal. Thus from a practical viewpoint the applicants have found the range 65 to 75 percent silver, 35 to 25 percent aluminum alloy gives a composition that has a moderate brazing temperature and bonds well to the beryllium metal surface.

The flux is a lithium halide mixture having a critical range composition of from 50 to 70 percent lithium fluoride and 50 to 30 percent lithium chloride by weight. It was found that a composition of 40–60 percent lithium fluoride—lithium chloride does not act as a satisfactory flux, i.e., this composition does not inhibit the formation of an oxide film on the beryllium metal, which film prevents the bonding of the silver-aluminum alloy to the beryllium during the coating process.

The method of coating the beryllium joint is accomplished by providing a molten bath of the silver-aluminum alloy which is covered with a molten flux layer of the lithium halide mixture. The beryllium parts to be joined are dipped into this bath by passage through the lithium halide flux layer directly into the silver-aluminum alloy layer and then out again through the flux layer. The thickness of the flux layer is dependent upon the design of the "tinning" or coating bath, i.e., a shallow bath will need a thicker layer of flux than a deep bath, so as to trap all impurities which otherwise would be introduced into the silver-aluminum layer whereas in the deep bath the upper part of the said coating layer functions as a trap for these impurities. The approximate flux thickness should be one-fourth the thickness of the said bath layer.

The method of joining the silver-aluminum coated beryllium joints is performed in any suitable brazing device such as an electric furnace or by an induction coil. It is important, however, during the brazing process that an inert atmosphere be maintained within the heating device. The inert atmosphere within the furnace is an additional precaution in preventing the formation of an oxide film on the beryllium metal coating while being brazed. Helium, argon or a vacuum are examples of the different types of inert atmospheres which are satisfactory. The brazing temperature is dependent upon the silver content of the alloy since the higher the silver content the higher the temperature must be to make the alloy fluid.

A specific example of this invention is as follows: the berrylium parts which are to be joined are hot dipped into a molten bath of 70 percent silver and 30 percent aluminum alloy by weight at 736° C. to 822° C. for 15 to 60 seconds. This silver aluminum bath is covered with a molten layer of flux composed of 60 percent by weight lithium fluoride—40 percent by weight lithium chloride. The lighter flux layer of lithium halide effectively prevents the beryllium metal from forming an oxidizing layer while the silver aluminum alloy is forming a brazing layer on it. The brazing of the parts so coated or "tinned" is performed in an electric muffle furnace in a helium atmosphere with the beryllium metal parts being held at a temperature of 700° C. for 10 to 15 minutes. Pressure is preferably applied to the joint by means of a static weight so as to hold the pieces in intimate contact, thus assuring a uniform distribution of the silver aluminum brazing metal along the surface of the joint. Joints made using the aforementioned brazing process have been tensile tested for joint strength evaluation and are superior in tensile strength to the beryllium metal itself.

Although the above description is by way of illustration, the specific details thereof are not intended as limitations upon the scope of this invention, but the scope is to be limited only by the following claims.

What is claimed is:

1. The process of joining together beryllium metal parts by a brazing process comprising the steps of dipping the beryllium portions to be joined into a molten bath of silver aluminum alloy, said alloy consisting of 65 to 75 percent silver by weight and the balance aluminum, and being at a temperature of 736° C. to 820° C. for 15 to 60 seconds, the said bath being covered with a molten layer of from about 50 to 70 percent lithium fluoride and from about 50 to 30 percent lithium chloride by weight, joining the beryllium pieces together under mechanical pressure and heating the parts to at least the melting temperature of the coating in an inert atmosphere to a temperature of 700° C. for 10 to 15 minutes.

2. The process of claim 1 where said alloy consists of 65 percent silver by weight and the balance aluminum, and where said molten layer consists of 50 percent of lithium fluoride—50 percent lithium chloride by weight.

References Cited in the file of this patent

UNITED STATES PATENTS

| | | |
|---|---|---|
| 2,332,426 | Atlee | Oct. 19, 1943 |
| 2,770,033 | Zarth | Nov. 13, 1956 |
| 2,798,843 | Slomin et al. | July 9, 1957 |
| 2,809,423 | Hanink | Oct. 15, 1957 |